April 20, 1965  O. S. KNEDLIK  3,179,383
METHOD FOR METERING AND BLENDING TOGETHER A PLURALITY OF FLUIDS
Original Filed March 1, 1963  2 Sheets-Sheet 1
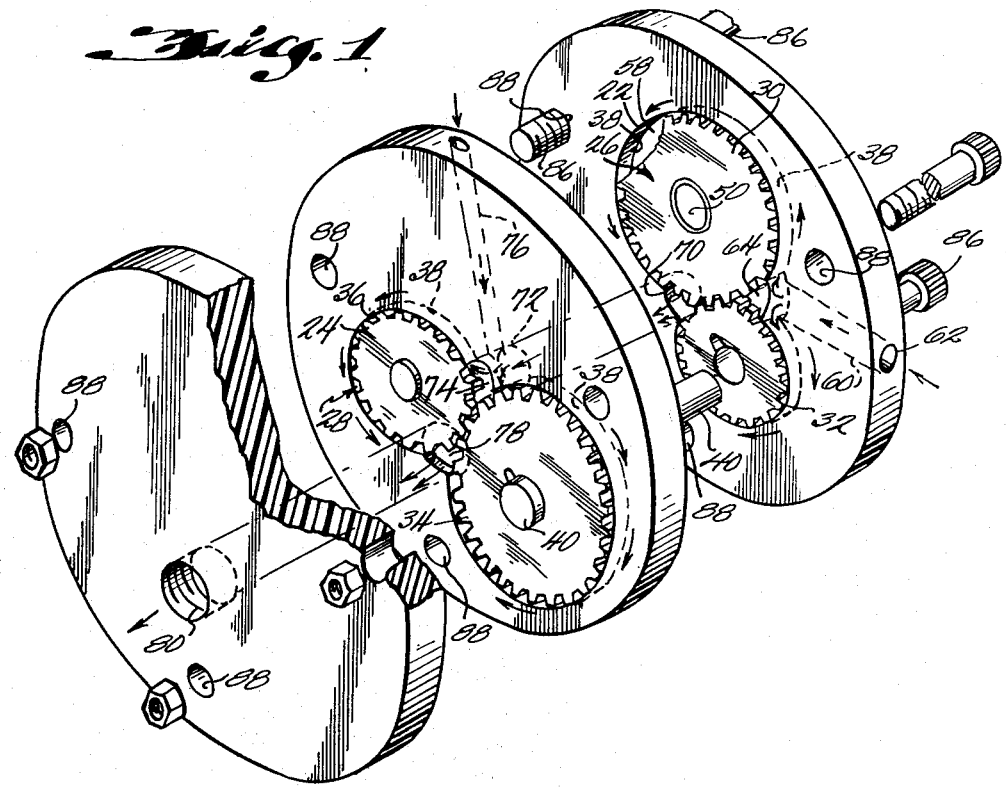
INVENTOR.
OMAR S. KNEDLIK
BY
Cushman, Darby & Cushman
ATTORNEYS

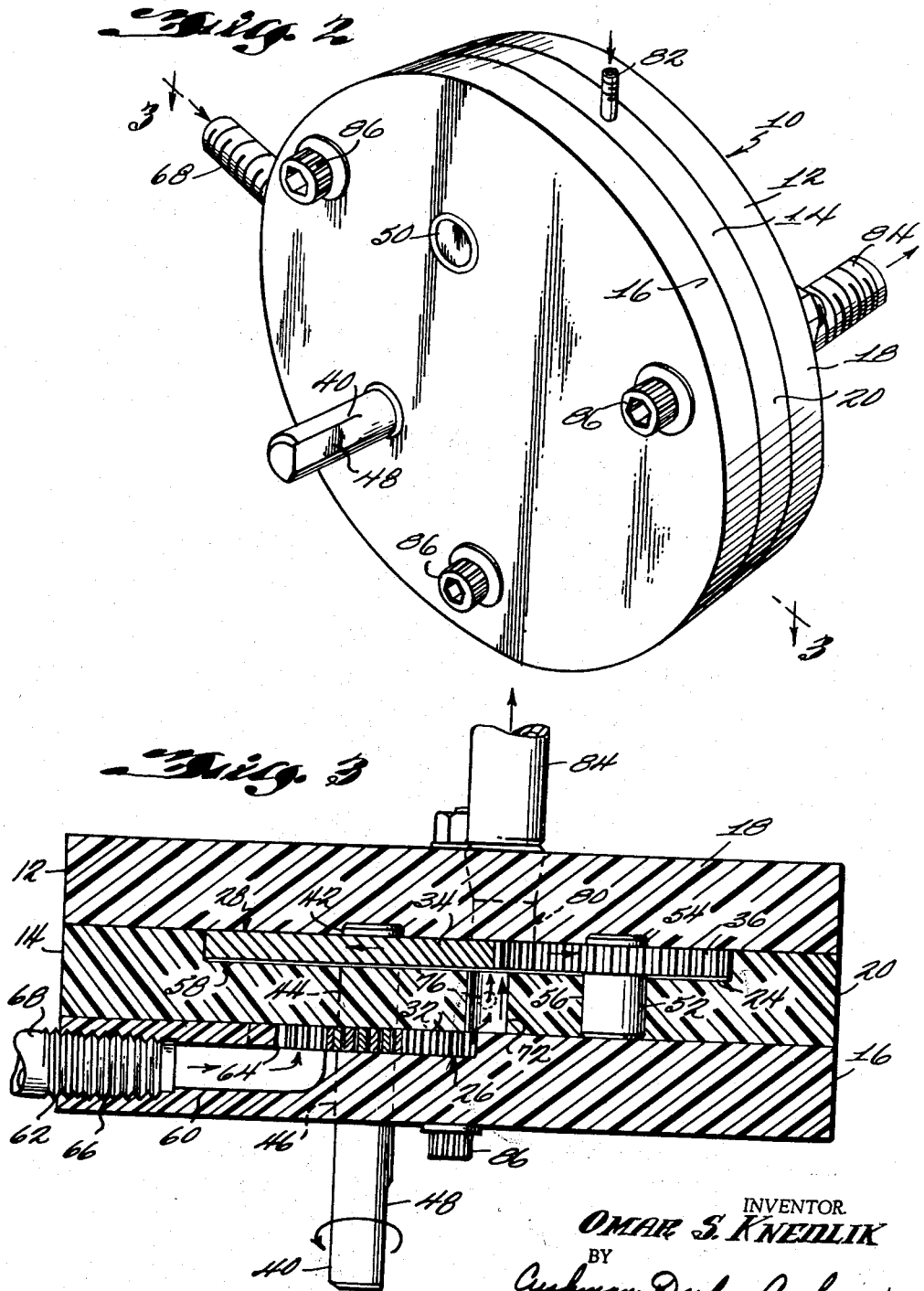
April 20, 1965 — O. S. KNEDLIK — 3,179,383
METHOD FOR METERING AND BLENDING TOGETHER A PLURALITY OF FLUIDS
Original Filed March 1, 1963 — 2 Sheets-Sheet 2
INVENTOR
OMAR S. KNEDLIK
BY Cushman, Darby & Cushman
ATTORNEYS

United States Patent Office 3,179,383
Patented Apr. 20, 1965

3,179,383
METHOD FOR METERING AND BLENDING
TOGETHER A PLURALITY OF FLUIDS
Omar S. Knedlik, Coffeyville, Kans., assignor to
Norton Knedlik, McCook, Nebr.
Original application Mar. 1, 1963, Ser. No. 262,057.
Divided and this application May 19, 1964, Ser. No. 376,286
7 Claims. (Cl. 259—95)

This application is a division of my copending application, Serial No. 262,057, filed March 1, 1963.

This invention relates to fluid metering and mixing methods and more particularly to an improved blending method.

The term blending pump as used herein refers to a variety of method especially used to mix a plurality of fluids together in predetermined quantities and simultaneously pump the mixture so produced to storage containers or mixture processing equipment. As an illustrative example, pumps of this variety are useful in the production of ice cream to blend the desired quantity of air with a liquid ice cream mix and deliver the foamed mixture directly into an ice cream freezing machine.

It is an object of the present invention to provide an inexpensive method for accurately blending a plurality of fluids together in predetermined proportions and delivering the mixture thus formed to a point outside the system.

It is a further object of the present invention to provide a method which utilizes blending pump comprising a plurality of modular stages in which a fluid is added radially of a first stage, metered thereby and pumped axially into an adjacent stage having a larger volumetric capacity and wherein a second fluid is added radially of the second stage, combined with the first fluid, and pumped from the second stage axially thereof.

These and other objects of the invention are more fully set forth in the following detailed explanation having reference to the attached drawings in which illustrative embodiments of the invention are shown, not to limit the scope of the invention but in order that the principles of the invention might be more clearly understood.

It should be recognized that the embodiments shown are merely illustrative of preferred forms of the blending pump of the invention and that many possible modifications thereto can be effected without departing from the principles of the invention.

In the drawings:

FIGURE 1 is an exploded perspective view of a two stage embodiment of the invention;

FIGURE 2 is a perspective view of the assembled blending pump shown in FIGURE 1;

FIGURE 3 is an enlarged sectional view taken along line 3—3 of FIGURE 2; and

FIGURE 4 is a side elevation view of a multi-staged embodiment of the present invention.

Now, with particular reference to the drawings wherein like numerals denote like parts among the several figures, a blending pump of the invention is illustrated generally at 10. In the embodiment shown in FIGURES 1-3 the pump 10 comprises a primary stage 12, a secondary stage 14 and a exit side cover plate 16. In a preferred form, the housings 18 and 20 of the primary and secondary stages respectively, and the cover plate 16 are all formed from a substantially transparent tough plastic material such as polymethyl methacrylate (Lucite) or polyoxymethylene (Delrin), although for some applications where corrosion and wear may be of particular importance, other materials such as stainless steel can be used. The use of transparent material is preferred because it allows the operator to observe the operation of each stage of the pump and make any process corrections necessary as a result of his observations.

As best shown in FIGURE 1, a substantially figure-8 shaped recess is formed in surface of the exit side of each housing, the recess 22 in the primary stage housing 18 being of a lesser depth than that of the recess 24 in the secondary stage 20 for reasons more fully set forth hereinafter. The recesses 22 and 24, although lying in substantially parallel planes, are angularly displaced from one another so that only one lobe of the primary stage recess 22 is coaxial with a lobe of the secondary stage recess 24. A pair of intermeshing spur gears 26 is contained for rotation in the primary stage recess 22 and a second pair of intermeshing spur gears 28, is contained for rotation in the secondary stage recess 24. The larger diameter gear 30 and the smaller diameter gear 32 comprising the primary gear pair 26 have the same transverse width, both being substantially equal in width to the depth of the recess 22. Likewise, the larger diameter gear 34 and smaller diameter gear 36 comprising the secondary gear pair 28 are each equal in width to the depth of the recess 24. It can thus be seen that because the secondary stage recess 24 is deeper than the primary stage recess 22 that the secondary gear pair 24 is wider than the primary gear pair 22 when all the gears used have teeth of approximately the same size, it will be seen that there is a greater inter-tooth volume in the gears of the secondary stage than in those of the primary stage, and that therefore the total inter-tooth carrying capacity of the gears of the secondary stage is greater than that of the first stage by a fixed amount.

The placement and diameters of the recesses 22 and 24 are such that the outer edges of the teeth of the gears carried therein are so nearly adjacent the sidewalls 38 of the recesses as to be in sliding contact therewith.

As best illustrated in FIGURE 1, the smaller gear 32 of the primary stage and the larger gear 34 of the secondary stage are removably keyed to a common drive shaft 40. The shaft 40 is journalled at its inner end in a shallow recess 42 formed in the inner surface of the cover plate 16 and extends through sealingly engaging openings 44 and 46 formed through the housings 18 and 20 respectively. The portion of the shaft 40 extending from the housing 18 may have a land 48 machined thereon as to receive the set screw of a driving pulley (not shown). The larger gear 30 of the primary stage is secured to a blind shaft 50 so journalled at one end in a shallow recess in the inlet face the secondary stage housing 20 and at the other end by a shallow recess formed in the floor of the recess 22. The smaller gear 36 of the secondary stage is secured to a blind shaft 52 journalled at one end in a shallow recess 54 in the cover plate 16 and at the other by a closely fitting opening 56 formed in the secondary stage housing centrally of the smaller lobe of the recess 24 therein.

According to the present invention, the working depth of each gear pair 26 and 28 and the tooth shape of each of the individual gears is such that the amount of fluid transferable between the intermeshing portion of each gear pair is negligible and substantially all of the fluid transferred by each gear pair is conveyed in the pockets defined by the spaces between the gear teeth, the floors 58 of the recesses and the surface of the next adjacent housing wall or cover plate, around the nonintermeshing portion of each gear.

In the preferred embodiment of the invention shown in FIGURES 1-3, an inlet conduit 60 is formed in the primary stage housing 18 radially thereof as to communicate an opening 62 at the outer edge of the housing 18 with the inlet side 64 of the gear pair 26. The conduit 60 may conveniently have interior threads 66 formed in the outer portion thereof as to receive an appropriately sized, threaded conduit 68 from a fluid supply. The exit side 70 of the primary stage 12 communicates with an axial conduit 72 extending between the exit side 70 of the primary gear pair 26 and the inlet 74 of the secondary gear pair 28. A fluid inlet conduit 76 is formed in the secondary stage originating at the outer edge of the secondary stage housing 20 and extending radially inward thereof to intersect the axial conduit 70. The outlet 78 of the secondary gear pair 28 communicates with a mixture outlet conduit 80 formed through the cover plate 16. Similarly to conduit 60, the conduits 76 and 80 may have interior threads formed in the outer portions thereof respectively to receive a conduit 82 from a second fluid supply and a conduit 84 to a mixture use or storage container.

The blending pump 10 is conveniently assembled as by threading bolts 86 through openings 88 formed through the pump axially thereof. A sufficient quantity of suitable noncontaminating sealing compound such as petroleum jelly may be expressed onto the mating surfaces of the housings 18 and 20 and exit cover plate 16 prior to the assembling of the pump for a more perfect seal between the stages.

As will readily be seen, the blending pump of the invention is quickly assembleable and can easily be taken apart for cleaning, sterilizing and replacement or interchanging of parts.

A second embodiment of the invention is illustrated in FIGURE 4. This blending pump 100 is similar in all respects to the one shown in FIGURES 1-3 except that the primary stage 102 and secondary stage 104 are succeeded by a plurality of additional stages 106 each having a slightly greater volumetric pumping capacity than the stage immediately preceeding. As with the first embodiment the gear pairs (not shown) in successive stages lie in substantially parallel planes and are angularly disposed from one another as to permit more easy visual inspection of each stage through the preferably transparent housings 108 and cover plate 110. The drive shaft 112 is elongated as to operatively engage one gear of each intermeshing pair and has a drive pulley 114 mounted thereon, connected as by an endless belt 116 to the output shaft 118 of a suitable motor. Because the pump of the present invention comprises modular stages or units, any number of stages having desired capacities may be assembled with one another to blend desired amounts of a selected number of fluids with one another to produce a mixture of definite proportion.

The term "fluids" as used herein is intended to apply to pumpable gases, liquids or solids or any mixtures thereof.

OPERATION

The operation of the embodiment shown in FIGURES 1-3 will now be described as to produce a foamed ice cream freeze mix, being mindful that the FIGURE 4 embodiment operates in a similar manner, but having additional stages.

Primary and secondary stages having the desired difference of volumetric capacity are selected and assembled as shown.

The primary stage inlet conduit 60 is connected to a supply of liquid ice cream mix, as through threaded conduit 68. This supply may be either a gravitational or pressurized feed. The secondary stage inlet conduit 76 is connected in like manner to a source of air which may be in the nature of a vent to the atmosphere or a pressurized air source. The mixture outlet conduit 80 is connected to a receiver of foamed mix receiver, such as an ice cream freezing machine and the drive shaft 40 is engaged by the output shaft of an electric motor and caused to rotate in the direction of the arrow (FIGURE 3) at a desired speed. The greater the speed, the greater will be the volume of foamed mixture produced.

As best shown in FIGURES 1 and 3, the cream in the inlet conduit 60 is drawn at the primary stage inlet 64 into the inter-tooth cavities of the two gears 30 and 32 of the primary gear pair as to substantially fill the cavities. The cream stream, thus continuously severed into two substantially equal parts, is conveyed around the nonintermeshing portion of the periphery of the primary gear pair 26 and recombined at the outlet 70. However, because the gear 30 has a greater diameter than the gear 32 and because the rim speed of the two gears is the same, the cream carried by the larger diameter gear 30 takes a greater amount of time to reach the outlet 70 and is therefore recombined with different quanta of cream in the cream stream from that it was divided from at the inlet 64. This mechanism serves to cause a greater homogenity of the mix metered by the first stage.

It can easily be seen that the amount of cream mix metered through the first stage, because cream mix is a liquid and therefore relatively incompressible, is substantially wholly dependent on the inter-tooth volume of the gears of the primary stage. The cream mix metered by the primary gear pair 26 is forced by the gear pair 26 from the outlet 70, through the axial conduit 72 into the inlet of the secondary stage. Because the secondary stage gear pair 28 has a larger inter-tooth capacity as aforementioned, and because the secondary gear pair 28 is rotated at the same speed as the primary pair 26, a suction is created in the axial conduit 72 which is dependent on the magnitude of the capacity difference between the two stages. The suction, beside drawing the mix from the primary stage outlet also constantly draws a fixed volume of air through the secondary stage inlet conduit 76. This air is added to the fluid mix in the axial conduit at such a velocity as to be turbulently mixed therewith causing the mixture to foam. The foamed mix is divided at the secondary stage gear pair inlet and conveyed around the nonintermeshing periphery of the gears 34 and 36 in the inter-tooth cavities. Again, because the inter-tooth cavities associated with each of the gears 34 and 36 is approximately the same size and because the gear) 34 has a greater diameter than the gear 16, approximately half of the entering foamed mix is metered around each of the gears and the quanta of mix conveyed around the smaller gear 36 reaches the secondary stage outlet 78 before that conveyed around the periphery of the larger gear 34 causing a greater amount of mixing than would be the case if the gears 34 and 36 were of the same diameter.

It can easily be seen that the amount of air added to the mix in the second stage is dependent on the increase in the capacity of the second stage over the first. In the preferred embodiment this increase is derived by increasing the thickness of the gears of the secondary pair and correspondingly increasing the depth of the recess 24 in the secondary stage housing 20. However, it is contemplated that this increase could be provided by other means, as by providing teeth on the secondary gear pair that would occupy less of the total volume between the root circle and addendum circle of each gear. The amount of air added by the second stage to the mix metered by the first stage is also dependent on the pressure exerted on the air from outside the valve. Air being compressible, it can easily be seen that a greater amount of air will be added through the conduit 76 if it is connected to the pressure side of an air compressor rather being open to air at one atmosphere pressure. Therefore, when the blending pump of the invention is employed to mix a plurality of fluids and at least one of the fluids is a gas, it is possible to vary the percent composition of the product of the blending pump by varying the inlet pressure of the gaseous constituent.

The foamed mixture metered by the secondary gear pair 28 is recombined at the outlet 78 and ejected from the pump through the exit conduit 80. It should be understood that in applications where more than two fluids are blended that additional stages are interposed between the secondary stage and the cover plate and that the outlet 78 of the secondary stage would lead to the inlet of a tertiary stage having a capacity greater than the secondary stage by a proportion equal to the desired proportional addition of a third fluid in the tertiary stage. A pump of the invention adopted to blend six constituents in fixed proportion is illustrated in FIGURE 4.

The outlets of the blending pumps 10 and 100 may be connected to foamed mix receivers such as a storage tank, or they may be connected to mixture users such as ice cream or frozen custard freezing machines. Because the blending pump of the invention is a positive displacement pump, it can be made to eject metered mixture from its outlet into a container having a considerable internal pressure.

*Example 1*

A supply of liquid ice cream mix is connected to the inlet of the primary stage of a two stage blending pump of the invention and metered thereby into the secondary stage which has twice the volume of the primary stage. The metered liquid mix traveling through the axial conduit between stages constantly primes the secondary stage, drawing air at 0 pounds gage pressure through the secondary stage inlet to mix with the liquid ice cream mixture. The two components become one foamy product as they turbulently mix in the axial conduit and travel around the peripheries of the secondary stage gears. The foamed product, discharged into a container having an internal pressure of 15 pounds, gage, is consistently composed of ⅔ part liquid and ⅓ part air by volume (50 percent overrun) due to the compression of the air.

*Example 2*

A two stage blending pump of the invention is assembled as a secondary stage having three times the capacity of the primary stage. The inlet conduit of the primary stage is connected to a supply of noncarbonated soft drink liquid and supply of carbondioxide at 0 pounds, gage, is connected to the secondary stage inlet conduit. When the pump is operated, two volumes of $CO_2$ will be metered into every volume of soft drink liquid and the frothy products, when ejected from the outlet of the second stage into a freezing compartment at 30 pounds, gage, contains ⅔ soft drink and ⅓ $CO_2$ by volume. The product when semi-frozen is a soft drink product having a 50 percent overrun.

*Example 3*

A three stage blending pump embodying principals of the invention is assembled from modular units as to have primary, secondary and tertiary stages of a volumetric capacity ratio of 1:6:18. These stages are employed, as above, to accurately blend 1 part soft drink syrup, 5 parts water and 12 parts carbondioxide respectively into a frothy mixture, and discharge the mixture into a pressurized freezing chamber to form a semi-frozen carbonated soft drink product comprising 1 part syrup, 5 parts water and 3 parts $CO_2$ by volume (i.e. drink in semi-frozen state that has a 50 percent overrun). The compressibility of $CO_2$ accounts for the reduction in its volumetric proportion in the pressurized freezing chamber.

Although the individual stages have been illustrated as generally round, disk-like members, it should be realized that the shape of the outer periphery of each stage may be square, rhomboidal or any other shape.

It will now be realized that several preferred forms of the invention have been set forth which fully accomplish the objects set forth at the beginning of this specification and the operation of these preferred forms has been set forth in great detail. However, those skilled in the art will realize that many omission, additions and substitutions may be made with regard to the preferred forms shown and explained without departing from the principles of this invention as set forth herein and therefore the extent of the invention should be limited only by the spirit and scope of the appended claims.

What is claimed is:

1. A method for effecting the blending of two flowing fluid streams comprising dividing the first flowing stream into two portions, retarding the advance of the fluid in one of said portions with respect to the flow of the other portion, recombining said portions, adding the second flowing fluid stream to the recombined first flowing fluid stream, dividing the resulting flowing stream into two portions, retarding the advance of the fluid in one portion with respect to the advance of the other portion and subsequently recombining the two portions of the mixed flowing fluid.

2. A method for effecting the blending of two flowing fluid streams and the pumping of the resulting mixture comprising, dividing the first fluid stream into two substantially equal portions, diverting one portion of the divided first fluid stream around a major segment of the periphery of a first rotating member diverting the other portion of the divided first fluid stream around a major segment of the periphery of a second rotating member having a substantially shorter length of periphery than the first rotating member and substantially the same rim speed, recombining the two portions of the first fluid stream, directing the second flowing fluid stream into the recombined first stream, dividing the mixed flowing fluid stream so mixed into two substantially equal portions, diverting one portion of the mixed stream around a major segment of the periphery of a third rotating member, diverting the other portion of the mixed stream around a major segment of the periphery of a fourth rotating member having a substantially shorter length of periphery than the third rotating member and substantially the same rim speed, recombining the two portions of the mixed fluid stream, whereby the impelling force exerted on the flowing fluids by said four rotating members pumps the fluids and resulting fluid mixture away from the rotating members.

3. A method as set forth in claim 2 wherein the first and second rotating members and the third and fourth rotating members respectively comprise a first and second pair of intermeshing, counter rotating spur gears, said first and third gears being secured for rotation on a common drive shaft and wherein the divided first stream and divided mixed stream are conveyed around said counter rotating gears in the inter-tooth spaces of the gears.

4. A method as set forth in claim 2 wherein the second flowing fluid stream is directed into the recombined first flowing fluid stream at a velocity and direction as to turbulently mix with the recombined first flowing fluid stream.

5. A method as set forth in claim 2 wherein the first fluid is a liquid, the second fluid is a gas and the resulting mixed stream is a foam.

6. A method for effecting the blending of a plurality of flowing fluid streams comprising dividing a first fluid stream into two portions, conveying both portions at the substantially same velocity through different lengths of path, recombining the portions so that the quanta of fluid in the portion conveyed the longer distance are longitudinally displaced in the recombined fluid stream from the quanta of fluid in the portions conveyed the shorter distance, subsequently adding further fluid streams one at a time to the recombined stream, dividing the resulting mixed stream into two portions, conveying both portions at substantially the same velocity through different lengths of path and recombining the two portions after each addition of a further fluid stream.

7. A method for effecting the blending of a plurality of flowing fluid streams as set forth in claim 6 wherein each subsequently added fluid stream is directed into the existing fluid stream at a velocity and direction as to turbulently mix with the existing fluid stream.

References Cited by the Examiner
UNITED STATES PATENTS 2,581,451  1/52  Sennet ------------------ 259—97
3,142,476  7/64  Goodwin ---------------- 259—95

CHARLES A. WILLMUTH, *Primary Examiner*.